United States Patent [19]

Wampler et al.

[11] Patent Number: 5,178,660
[45] Date of Patent: Jan. 12, 1993

[54] APPARATUS FOR BENDING GLASS SHEETS

[75] Inventors: David M. Wampler; Raymond L. Brandeberry; Ermelinda A. Apolinar, all of Toledo; Timothy C. Holt, Perrysburg. all of Ohio

[73] Assignee: Libbey-Owens-Ford Co., Toledo, Ohio

[21] Appl. No.: 721,258

[22] Filed: Jun. 26, 1991

[51] Int. Cl.$^5$ ............................................. C03B 23/03
[52] U.S. Cl. ...................................... 65/273; 65/162; 65/356
[58] Field of Search ................. 65/106, 162, 273, 287, 65/356, 104

[56] References Cited

U.S. PATENT DOCUMENTS

| | | | |
|---|---|---|---|
| 3,418.098 | 12/1968 | Kirkman | 65/106 |
| 3,753,673 | 8/1973 | Pickard et al. | 65/106 |
| 4,670,036 | 6/1987 | Enk et al. | 65/106 |
| 4,909,819 | 3/1990 | McMaster et al. | 65/106 |
| 5,009,694 | 4/1991 | Nishitani et al. | 65/104 |

Primary Examiner—Joye L. Woodard
Attorney, Agent, or Firm—Marshall & Melhorn

[57] ABSTRACT

The present invention relates to a female press bending ring for use in the press bending of glass sheets outside of a furnace, and more particularly to a female press bending ring which is suitably heated during the bending cycle to regulate the transfer of heat between the peripheral margin of the glass and the female bending ring with which it is in contact. By so doing, near-edge tension and edge stresses are greatly reduced, thereby reducing chill cracking and glass breakage during and after production. The female ring may be covered by a layer of fiberglass cloth or the like to provide a smooth resilient surface for engaging the glass sheet.

9 Claims, 2 Drawing Sheets

APPARATUS FOR BENDING GLASS SHEETS

BACKGROUND OF THE INVENTION

1. Field of the Invention

The present invention relates generally to the production of bent sheets of glass, and more particularly to an improved method and apparatus for press bending glass parts.

2. Background of the Invention

Curved or bent sheets of glass are commonly used as glazing closures in automotive vehicles and the like. It is imperative that the glass sheets be bent to precisely defined curvatures determined by the configuration and size of the vehicle openings, as well as the overall styling of the vehicle. At the same time, the bent sheets must meet stringent optical requirements, i.e., the viewing area of the closure or window must be free from optical defects that would tend to interfere with clear viewing therethrough. Thus, it is necessary that the bending apparatus not only shape the glass sheets to precise curvatures, but also that it do so without adversely affecting their optical quality.

Over the years as automotive styling has evolved, the shapes to which the sheets must be bent have become increasingly complex, and thus the sheets have become more difficult to efficiently produce on a mass-production basis. Such curved or bent sheets are now generally produced by a so-called "press bending" technique wherein flat glass sheets are heated to a temperature corresponding substantially to the softening point of the glass. The heated sheets are then pressed or shaped to the desired curvature between male and female mold members having complementary shaping surfaces. The bent sheets are cooled in a controlled manner to either anneal or temper the glass as dictated by their intended end use. Such press bending may suitably be carried out with the sheets oriented vertically, horizontally or obliquely. To achieve a high degree of accuracy in the configuration of the curved sheet while minimizing the application of pressure to the glass surfaces in their viewing area by the press members, the male or convex mold member is generally constructed with a solid or continuous shaping surface which contacts the entire surface of the sheet. Conversely, the cooperating female or concave mold member is constructed with an outline or ring-type shaping surface which engages only the surface of the peripheral marginal edge portions of the sheet.

In such press bending operations the female ring, prior to contacting the glass during the pressing operation, may be at a substantially lower temperature than the preheated glass. This is particularly true when the press bending is performed outside of the furnace. Consequently, when the heated glass contacts the relatively cooler bending ring, heat is transferred from the hot glass to the cooler bending ring, preferentially cooling the glass in these areas. As a result, the temperature of the glass in these localized areas is greatly reduced, causing tensile stresses to be created inboard of but near the bending ring. If the differences in temperature are great enough, the tensile stresses may result in chill cracks being produced in the glass sheet. In any event, the near-edge tensile stresses decrease the strength and durability of the glass sheet, leading to increased breakage after production.

In the past, efforts have been made to reduce the amount of tensile stresses formed in this way. For example, in accordance with U.S. Pat. Nos. 3,253,898 and 3,278,288, a gravity bending mold is provided with resistance type heating elements along the shaping rail to aid in the controlled cooling of the glass during annealing. Such gravity molds bend glass sheets utilizing heat and gravity, and the amount of bend that may be produced in the sheets is limited. Due to styling advances, there is an ever-increasing demand in the automotive industry for windshields having deeper bends and bends of smaller radius than can be satisfactorily achieved using gravity bend methods. Consequently, a great deal of developmental work has been directed to the press bending of windshields. Since windshields normally are fabricated from relatively thin sheets of glass (less than 3mm), they tend to cool rapidly and are especially prone to chill cracking and reduction of edge strength due to the formation of tensile stresses caused by contact with the female bending ring.

U.S. Pat. No. 3,837,833 discloses a cloth-covered shaping rail in a press bending operation that is provided with heated metal cover protectors located in areas that are more susceptible to wear. The purpose of the metal cover protectors is to prolong the useful life of the cover cloth. The stainless steel metal protector is electrically heated to eliminate any tendency for thermal shock to occur in the glass sheet when contacting the exposed metal protectors.

SUMMARY OF THE INVENTION

The present invention provides a female press bending ring which is suitably heated during the bending cycle to regulate the transfer of heat between the peripheral margin of the glass and the female bending ring with which it is in contact. By so doing, near-edge tension and edge stresses are greatly reduced, thereby reducing chill cracking and glass breakage after production. The female ring may be covered by a layer of fiberglass cloth or the like to provide a smooth resilient surface for engaging the glass sheet.

It is a primary object of the present invention to provide an improved female ring for press bending glass sheets.

Another object of the invention is to provide such a female bending ring including means for heating the ring to reduce stresses in the glass caused by contact with the ring.

DESCRIPTION OF THE PREFERRED EMBODIMENT

Figure 1:
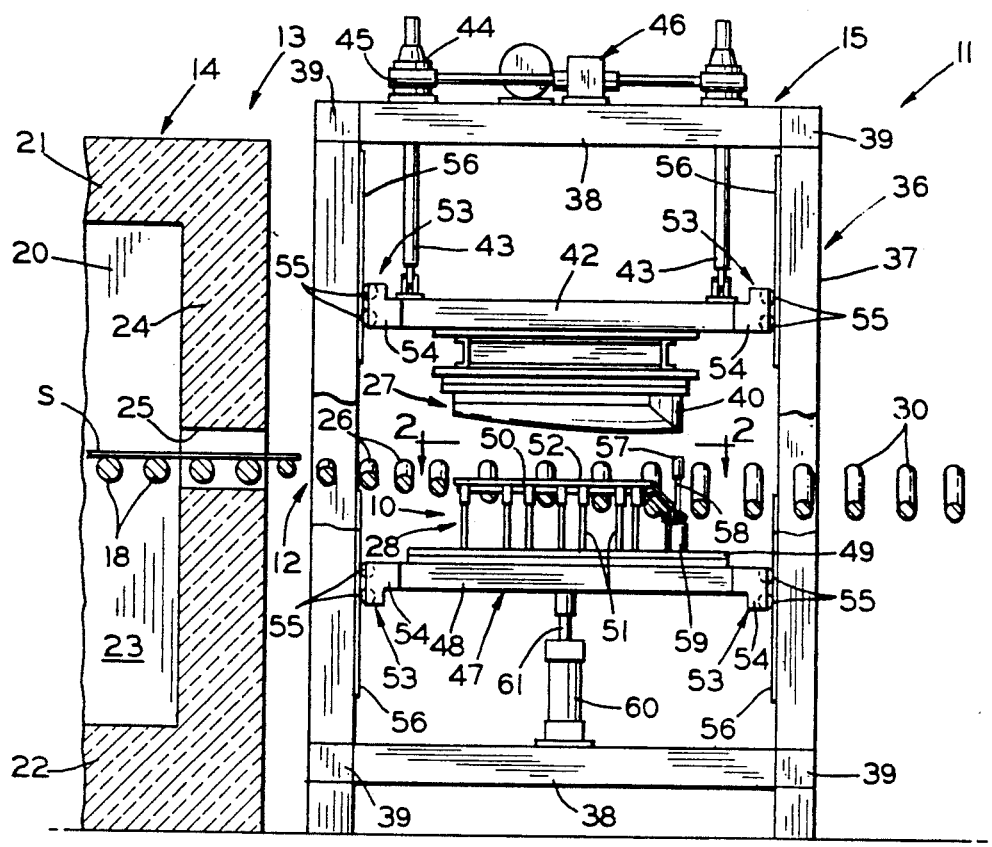
FIG. 1 is a side elevational view of a press bending apparatus embodying the novel bending mold of the invention.

Referring to FIG. 1, there is shown generally at 10 the improved bending member of the invention, embodied in a horizontal press bending and tempering facility comprehensively designated 11. It should be understood that while the invention will be described in connection with a horizontal bending apparatus as illustrated in the drawings, it is not restricted to such an apparatus but also has utility in a vertical press bending apparatus or any other bending apparatus utilizing a ring type bending member for shaping sheets of glass or the like.

The facility 11 more particularly includes a continuous conveyor system 12 adapted to support a plurality of sheets S for movement in a generally horizontal path through a heating station 13 including a furnace 14 for heating the sheets to their softening point or bending temperatures, and a bending station 15 embodying the bending member 10 where the sheets S are bent to the desired shape. In producing bent sheets for lamination as windshield units, an annealing station (not shown) is typically provided to appropriately cool the sheets of glass in a controlled manner for annealing subsequent to the bending operation. However, the invention is not restricted to bending annealed glass parts, but may as well be utilized in a facility wherien a tempering station (not shown) is provided adjacent the bending station for rapidly reducing the temperature of the bent sheets to produce the desired temper therein.

Typically, the glass sheets S are heated in a controlled manner while being conveyed through the furnace 14 on aligned conveyor rolls 18 forming part of the conveyor system 12. The furnace 14 may be of any conventional construction and is illustrated in FIG. 1 as a tunnel-type furnace having a heating chamber 20 defined by a roof 21, a bottom wall 22, opposite side walls 23 and an end wall 24. The heating chamber 20 is heated by suitable heating means such as gas burners or electrical resistance heaters (not shown) disposed in the top, bottom and side walls and suitably regulated to provide a desired heating pattern for the glass sheets moving therethrough.

The sheets S are carried through the heating chamber 20 on the conveyor rolls 18 of the conveyor system 12 which extend from the entrance end (not shown) of the furnace 14 through an opening 25 in the end wall 24. The glass sheets S are heated to substantially the softening point of the glass as they are conveyed through the controlled temperature environment of the furnace 14. Upon exiting the furnace through opening 25, the sheets S are received on a second series of conveyor rolls 26 for movement into and within the bending station 15 between opposed upper and lower press members 27 and 28, respectively, which impart the desired curvature thereto.

After the sheets are bent, they are advanced along the conveyor 12 on a fourth series of rolls 30 which typically convey the glass sheets S through either an annealing or tempering station. In a tempering station, the bent glass sheets would pass between upper and lower blastheads, respectively, having a plurality of tubes operably disposed to direct opposed streams of cooling fluid, such as air or the like, towards and against the opposite surfaces of the sheets moving along the conveyor. If the sheets are to be annealed as for use in laminated windshields, the sheets are allowed to cool slowly in a suitably controlled environment.

The press bending station 15, with reference to FIG. 1, comprises a skeletal framework 36, generally in rectangular parallelepiped form, including upstanding corner posts 37 interconnected at their top and bottom by longitudinal beams 38 and transverse beams 39 to form a rigid box-like structure. The rolls 26 of the bending station are drivingly mounted upon the framework in a conventional manner (not shown). Mounted within the framework 36 for reciprocating relative movement toward and away from each other are the upper and lower press members 27 and 28, respectively, which are provided with opposed complemental shaping surfaces conforming to the curvature to which the sheets are to be bent.

The glass sheets S are typically flat as they are introduced into the entrance end of the heating furnace 14, and thus the rollers 18 within the furnace are generally of cylindrical form. As the glass sheets are gradually heated to exceed their plastic set temperature and exit form the furnace 14 through the opening 25, or even while in the latter stages of the furnace 14, it has been found desirable to provide rollers for conveying the glass sheets S which are progressively contoured from the straight, cylindrical configuration at the cold end of the furnace 14 toward a configuration which substantially conforms to the shape of the finished, formed glass sheets, such as the rolls 26 employed within the bending or forming station 15. Consequently, the heated glass sheets moving over and contacting the rollers are progressively preformed during their traverse through the exit end and out of the furnace, so that as they move into position for the bending or forming operation, they will have assumed a partially formed shape conforming generally to that of their desired final configuration.

The upper or male press member 27, as will be hereinafter more fully described, comprises a shaping element 40 carried upon a platen frame 42. The platen frame 42 is preferably constructed to be vertically adjustable in order to accommodate glass parts bent to varying degrees of curvature between the opposed press members. Accordingly, the platen frame 42 is operatively attached at each of its corners within the framework 36 to the lower ends of screw jack rods 43. The rods 43 are threadably received at their uppermost ends within rotatable collars 44 of screw jack bases 45 carried on a framework comprised by the beams 38 and 39 atop the framework 36. Also carried atop the framework is a motorized drive unit 46 adapted to rotatably drive the collars 44 in unison for retracting or extending the rods 43 to correspondingly raise or lower the platen frame 42 and the shaping element 40 carried thereby.

As best illustrated in FIG. 1, the upper male press member 27 of the invention is of the so-called solid or continuous type. To that end, the male shaping element 40 includes a continuous glass contacting surface having a configuration complementary to that of the lower female press member 28.

The lower or female press member 28, as will be hereinafter described, is also mounted for vertical reciprocal movement and, to that end, comprises a carriage, shown generally at 47, which includes a bed 48 upon which a base plate 49 is mounted. A shaping rail 50 is mounted in spaced relation to the base plate 49 by a series of connecting rods 51. The shaping rail 50 conforms in outline to the glass sheets S to be bent, and is provided on its upwardly directed face with a generally concave shaping surface 52 complimentary to the shaping surface of the male press member 27 in opposed relationship thereto. The particular outline of the shaping rail 50, as well as the specific curvature of the shaping surface 52, of course, are dictated by the predetermined finished shape of the glass sheet being bent and can vary as desired.

In order to insure that the platen frame 42 and the carriage 47 move freely up and down along a precise vertical path within the framework 36, they are provided at each of their corners with stabilizing roller guide means 53. The guide means 53 include brackets 54 affixed to the corners of the platen frame 42 and carriage 47. Each bracket carries a spaced pair of rollers 55 mounted perpendicularly to one another and adapted to rollingly engage track plates 56 affixed to adjacent angularly disposed faces of the associated corner posts 37. The platen frames are thus held firmly against lateral movement while being able to move freely up and down along a vertical path.

As heretofore explained, the conveyor rolls are progressively contoured, that is, are of increasing curvature, from the straight cylindrical shape at the cold end of the furnace toward the bending station whereat they substantially conform to the shape of the finished bent glass sheets. This roll configuration continues from the bending section into at least the initial stages of the tempering or annealing section. The contoured conveyor rolls, such as the rolls 26 which are employed in the bending area, are preferably of the type comprising an inner, hollow, stationary core member and an outer, flexible, load-carrying sleeve rotatable thereabout. Consequently, the heated glass sheets moving over and in contact with the rolls are progressively preformed or bent during their movement from the furnace so that as they move into position for press bending, they will have attained a partially bent shape conforming generally to that of the mold and of the desired final configuration. The end segments of the contoured rolls curve downwardly so as to pass beneath the shaping rail when it is in its lowered position. Such contoured conveyor rolls with rotatable sleeves are disclosed and described in U.S. Pat. No. 4,670,036, which is incorporated herein by reference.

The lower press member 28 is of conventional outline or ring-type construction, and normally resides in a rest position, whereat the ring may accept a partially bent sheet from the contoured rolls 26 of the bending station 15. The lower press member 28 is mounted for vertical reciprocal movement to lift a sheet S from the rolls 26 and press it against the upper press member 27, and then return the bent sheet to the rolls 26 for advancement out of the bending station 15 and onto the rolls 30 for transfer to a tempering or annealing station.

In order to accurately position the glass sheets S between the upper and lower press members 27 and 28, there is provided in the path of the advancing glass sheet between adjacent ones of the rolls 26 a pair of laterally spaced locator stops 57. Each stop is attached to the distal end of a piston rod 58 of a fluid actuated cylinder 59 mounted on the base plate 49 of a vertically reciprocal carriage 47. The cylinders 59 are operative to raise and lower the stops 57 between an upper raised position, whereat they protrude above the conveyor rolls 26 into the path of the advancing glass sheets S, and a lower position therebeneath.

The base plate 49 is carried on the bed 48 of the carriage 47 and is movable therewith. A fluid actuated cylinder 60 is mounted beneath the carriage 47 and carried by the beams 38. The cylinder includes a piston rod 61 affixed at its distal end to the bed 48 of the carriage 47 for reciprocally moving the lower or female press member 28 between its retracted position, whereat the shaping rail 50 may accept a glass sheet from the conveyor rolls 26, and its raised position whereat the shaping rail 50 is adapted to lift a heated sheet S from the conveyor rolls and press it against the male press member 27 between the complementary shaping surfaces of the male element 40 and the shaping rail 50, to bend it to a predetermined curvature. Upon completion of bending, the piston rod 61 is retracted to lower the carriage 47, thereby retracting the shaping rail 50 to its rest position and depositing the bent sheet on the conveyor rolls 26 for transport from the bending zone. The stop means 57 are, in the meantime, retracted so that the bent sheet may be advanced out of the bending section by the rolls 26 and 30.

The connecting rods 51, by which the shaping rail 50 is attached to the base plate 49, are strategically positioned to provide sufficient support to the shaping rail 53 to resist deformation during the bending process and to permit adjustments to be made to the contour thereof when necessary. The number of connecting rods 51 required and the particular arrangement varies and is dependent upon the particular part being produced.

Figure 3:
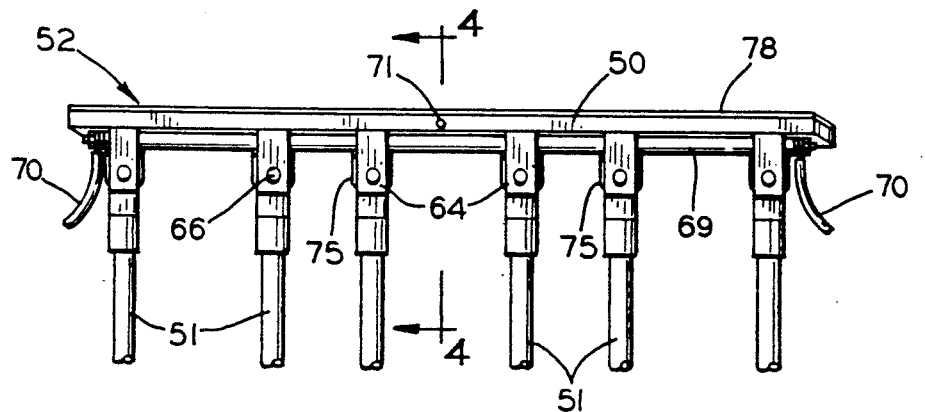
FIG. 3 is an enlarged, fragmentary end view taken substantially along line 3—3 of FIG. 2.
Figure 4:
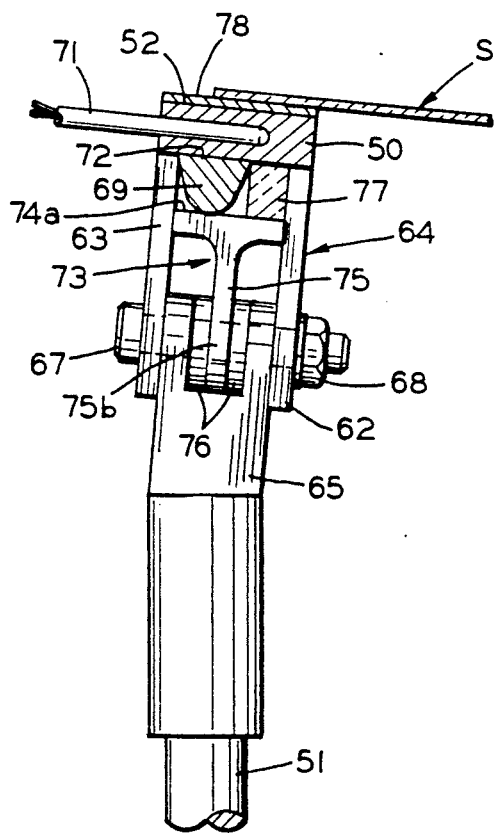
FIG. 4 is an enlarged, fragmentary sectional View taken substantially along line 4—4 of FIG. 3, illustrating in detail a preferred embodiment of the shaping rail, thermocouple and heating element in accordance with the invention.
Figure 5:
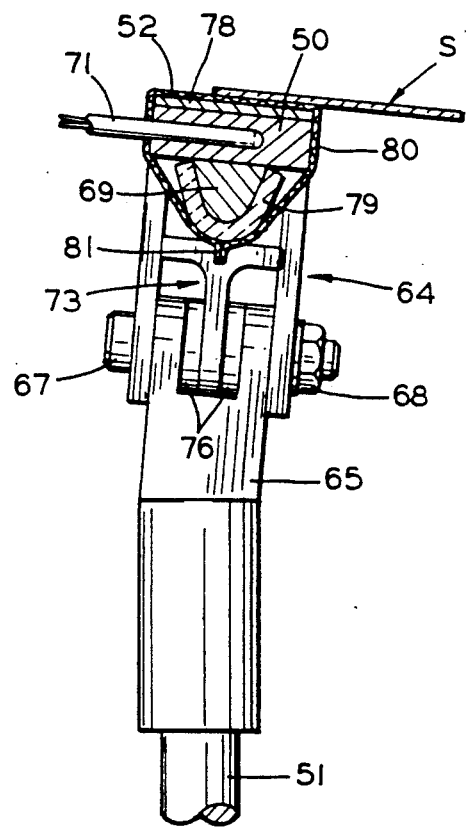
FIG. 5 is a view similar to FIG. 4, illustrating in detail an alternate embodiment of the invention.

As best illustrated in FIGS. 3, 4 and 5, connecting plates 62 and 63, depend downwardly from the shaping rail 50 along the inside and outside edges, respectively, at spaced locations therealong. Each connecting plate 63 along the outside edge is disposed opposite a connecting plate 62 along the inside edge of the shaping rail, such that each pair of connecting plates forms a clevis 64. At the top of each connecting rod 51 there is provided a yoke 65, which is adapted to be secured within one of the clevises 64 as by a bolt 66. The bolt 66, which includes a headed portion 67 at one end, extends through aligned openings the yoke 65 and clevis 64, and is secured at its opposite end by a suitable fastening means such as a nut 68. Thus the pin pivotally connects the yoke 65 to the clevis 64, and thereby the shaping rail 50 to the connecting rods 51. In order to provide for limited adjustment of the contour of the shaping rail 50, each connecting rod 51 may include adjusting means such as a conventional turnbuckle arrangement (not shown) intermediate its ends. Thus, upon manipulation of the adjusting means of a particular connecting rod 51, the associated section the shaping rail 50 may be raised or lowered. In this way, the connecting rods 51 can be readily adjusted to correct for nonuniform pressing of the glass sheet by the shaping rail 50 against the upper male press member 27.

Figure 2:
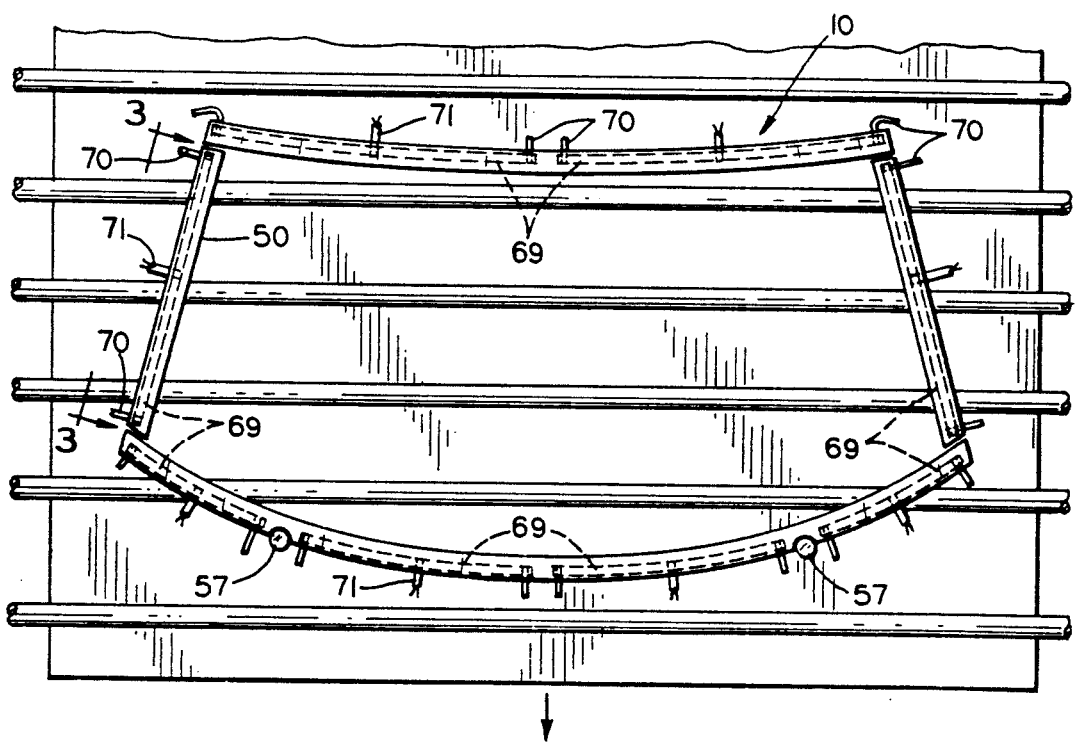
FIG. 2 is an enlarged, fragmentary, plan view taken substantially along line 2—2 of FIG. 1, and illustrating the thermocouples and heater elements (in phantom lines) of the female bending ring.

The shaping rail 50 typically may be fabricated of stainless steel or other material capable of withstanding the temperature to which it is subjected, and is preformed to a desired shape and curvature consistent with the shape of the glass part being produced. Since the press member 28 is exposed to the ambient atmosphere and operates intermittently, the upwardly directed surface 52 of the shaping rail 50 may be at a considerably lower temperature than the preheated glass with which it comes in contact, in which case the shaping ring will tend to absorb heat from the glass in the area of contact. This localized heat removal creates tensile stresses near the edges of the glass which, in turn, may result in an increased amount of glass breakage during and after forming. In order to avoid this localized removal of heat from the glass and consequently reduce the amount of breakage, in accordance with the present invention heating elements 69 are provided beneath the shaping rail, as illustrated in FIGS. 2 through 5. The heating elements 69 are preferably of the electric resistance type. One such particularly suitable heating element is available commercially under the product designation "INCOLOY SHEATH" (registered trademark), manufactured by Industrial Heating Products, Inc., of Pittsburgh, Pennsylvania, U.S.A. As shown in FIG. 2, the heating elements 69 are of a generally elongated configuration having a width enabling them to fit lengthwise beneath the shaping rail. A plurality of individually controlled heating elements may be disposed along and beneath the entire length of shaping rail 50 in order to heat the shaping rail according to a desired pattern.

Electrical leads 70 are provided for connecting the heating elements 69 to a suitable power source (not shown). Thermocouples 71 may be utilized at selected locations along the shaping rail 50 to monitor the temperature of the shaping rail, so that the temperature of the heating elements 69 may be adjusted and controlled to maintain the shaping rail 50 according to the desired temperature for the particular glass part being produced. The thermocouples are typically inserted into chambers that have been drilled into the shaping rail 50 at selected locations spaced around the entire length of the shaping rail 50. Preferably, at least one thermocouple is provided in the shaping rail adjacent each heating element.

The heating elements 69, as shown in cross-section in FIG. 4, preferably have a substantially flat surface 72 facing the shaping rail 50 in order to increase the surface area of the heating element available for contact with the shaping rail 50. By positioning the flat surface 72 against the undersurface of the shaping rail, the surface area of the heating elements directly contacting the undersurface of the shaping rail 50 is maximized, thereby increasing the ability of the heating element 69 to conduct heat to the shaping rail. The heating elements 69 may be supported with their flat surface 72 urged against the undersurface of the shaping rail 50 by heater element support stands 73. The heater element support stands 73 are generally T-shaped in cross-section, and comprise a top flange 74a and a web 75b. The flange 74a is confined between the two downwardly extending connecting plates 62 and 63 that comprise the yoke 64. At the lower distal end of the web portion 75b of the support stand 73, an opening is provided for receiving the retaining bolt 66. Thus, as shown in FIGS. 4 and 5, the support stand 73 is secured on the retaining bolt 66 between the clevis 64 and the yoke 65. Spacer washers 76 are provided on the retainer bolt 66 on either side of the web 75b for securing the support stand 73 in position as the nut 68 is tightened. A spacer bar 77 may be used to laterally position the heating element to the inside or outside of the shaping rail, as shown in FIG. 4, as may be found desirable for a particular part to be bent. Inasmuch as the spacer bar 77 may be in direct contact with the heating element 69, it may be desirable to form the spacer bar of a suitable insulating material to deter heat removal from the heating element 69.

In operation, the power supply supplies an electric current, through the leads 70, to the heating elements 69. The temperature of the heating elements rises due to resistance heating, and heat is transferred by conduction and radiation to the undersurface of the shaping rail 50. As the undersurface of the shaping rail increases in temperature, so does the upper surface of the shaping rail, due to conductive transfer of heat through the shaping rail from the lower surface to the upper surface. The temperature of the shaping rail is monitored using thermocouples 71 that are inserted into chambers extending into the body of the shaping rail. By suitably adjusting the power applied to the heating elements in response to observed temperatures, the temperature of the heating elements may be raised or lowered, thereby regulating the temperature of the shaping rail 50.

It may be desirable to interpose one or more cover layers 78 of an insulating material on top of the shaping surface 52 of the shaping rail 50 to insulate the shaping rail from the hot glass and to assist in smoothing out any irregularities in the shaping surface 52. The insulating cover layer 78 may, for example, comprise a mat of silica, alumina or alumino-silicate fibers bonded together with 1 to 25 percent by weight of an inorganic binder such as colloidal alumina, colloidal silica or a mixture thereof. A particularly suitable material is available commercially under the product designation "FIBERFRAX DURABOARD 1200 (registered trademark)". The cover can be left untreated or, preferably, may be treated with a suitable rigidizer such as that available from the Carborundum Company, Niagara Falls, New York, U.S.A., under the name Rigidizer W. The material is an inorganic liquid binder compound comprising an aqueous suspension of about 40% colloidal silica and a wetting agent which, when applied to the fibrous material, causes a significant increase in the rigidity and surface hardness of the layer. The mold shaping surface can be adapted as determined appropriate for bending a particular part, by providing more than one insulating cover layer as previously mentioned, and using the layers in the untreated state or treating any combination with the rigidizer to provide the degree of rigidity or hardness desired.

FIG. 5 illustrates an alternate embodiment of the invention, in which the heating element is centered beneath the shaping rail. A support stand 73 is again used to position the heating element beneath the shaping rail 50. In order to minimize heat loss from the heating element, the exposed undersurface of the heating element may be covered with a layer 79 of insulating tape. In addition, the shaping rail and heating elements may be enclosed within sleeves 80 of a suitable non-abrasive heat resistant material, such as knit fiberglass cloth, to present a smooth and somewhat resilient surface to the heat-softened glass. It may also be desirable to interpose one or more of the insulating cover layers 78 between the fiberglass sleeves 80 and the shaping surface 52 of the shaping rail 50 for insulating purposes, as explained hereinabove. The sleeves 80, as best shown in FIG. 5, cover the insulating cover layer or layers, extending over the sides and ends of the shaping rail 50 and heating elements, and are typically secured by stitching 81 so as to be maintained in a taut, wrinkle-free condition over the insulating cover layer 78. Typically, the heating element 69 and shaping rail 50 are covered with the fiberglass cloth after the apparatus has been assembled, pulled tight around the shaping rail, and stitched together at 81 to form the sleeve 80.

In accordance with the provisions of the patent statutes, the principle and mode of operation of the present invention have been described in what is considered to represent the preferred embodiments However, it should be understood that the invention may be practiced otherwise than as specifically illustrated and described without departing from its spirit or scope.

It must be noted that the prior art referred to hereinabove has been collected and examined only in light of the present invention as a guide. It is not to be inferred that such diverse art would be assembled absent the motivation provided by the present invention.

What is claimed is:

1. In apparatus for press bending heated glass sheets to a predetermined configuration including a ring-type shaping rail having a shaping surface conforming in outline and curvature to the configuration to be imparted to the glass sheets, a continuous shaping surface complementary to said configuration opposite said shaping rail, means for advancing a heated sheet from an adjacent furnace into press bending position between said shaping rail and continuous shaping surface, and means for moving said shaping rail and said continuous shaping surface toward and away from one another for press bending said heated sheet between said shaping surface and said opposed continuous shaping surface to said predetermined configuration, the improvement comprising heating means disposed along and in contact with said shaping rail opposite said shaping surface to provide heat to at least a portion of said shaping rail for supplying heat to said portion for reducing heat transfer from said heated sheet to said shaping rail during press bending, said heating means comprising a plurality of individual elongated electrical resistance heating element segments disposed beneath and substantially entirely around said ring-type shaping rail, and means individually connecting each said resistance heating element to a controllable source of electrical energy, said shaping rail and said heating elements disposed therebeneath being supported upon a base plate by a plurality of connecting rods positioned at spaced locations around said shaping rail, each said connecting rod having a bifurcated connecting yoke at its end adjacent said shaping rail, a spaced pair of connecting plates affixed to said shaping rail at each said connecting rod for receiving said connecting yoke therebetween, and pin means extending through said connecting plates and yoke for affixing said shaping rail to said connecting rod.

2. Apparatus for press bending heated glass sheets as claimed in claim 1, including temperature sensing means measuring the temperature of said shaping rail adjacent said heating element whereby the heat output of said heating element may be controlled in response to the measured temperature.

3. Apparatus for press bending heated glass sheets as claimed in claim 1, including temperature sensing means measuring the temperature of said shaping rail adjacent each said heating element whereby the heat output of each said heating element may be controlled in response to the measured temperature of the shaping rail adjacent said heating element.

4. Apparatus for press bending heated glass sheets as claimed in claim 3, wherein said temperature sensing means comprises a thermocouple for monitoring the temperature of said shaping rail opposite each said heating element.

5. Apparatus for press bending heated glass sheets as claimed in claim 1, including support stand means carried by said pin means between said spaced connecting plates, said elongated heating elements resting upon said support stands beneath said shaping rail.

6. Apparatus for press bending heated glass sheets as claimed in claim 5, wherien said shaping rail comprises a flat lower surface, said heating elements including a planar surface facing said flat surface, said support stand means urging said planar surface into face-to-face engagement with said flat lower surface for enhancing heat transfer from said heating elements to said shaping rail.

7. Apparatus for press bending heated glass sheets as claimed in claim 6, including a layer of insulating material adjacent at least a part of the surface of said heating element not in engagement with said flat lower surface.

8. Apparatus for press bending heated glass sheets as claimed in claim 7, wherien said layer of insulating material is disposed over the entire surface of said heating element not in engagement with said flat lower surface.

9. Apparatus for press bending heated glass sheets as claimed in claim 8, including a sleeve of non-abrasive heat-resistant material surrounding at least part of said shaping rail, layer of insulating material thereon and heating elements.

* * * * *